US012693055B2

(12) United States Patent (10) Patent No.: US 12,693,055 B2
Dong et al. (45) Date of Patent: Jul. 28, 2026

(54) CONTROL METHOD, CONTROL APPARATUS, AND ELECTRONIC EXPANSION VALVE

(71) Applicant: Zhejiang DUNAN Artificial Environment Co., Ltd., Zhejiang (CN)

(72) Inventors: Shenghai Dong, Zhejiang (CN); Fugang Wang, Zhejiang (CN); Zhiguo Song, Zhejiang (CN)

(73) Assignee: Zhejiang Dunan Artificial Environment Co., Ltd., Zhejiang (CN)

( * ) Notice: Subject to any disclaimer, the term of this patent is extended or adjusted under 35 U.S.C. 154(b) by 433 days.

(21) Appl. No.: 18/517,398

(22) Filed: Nov. 22, 2023

(65) Prior Publication Data

US 2024/0085072 A1 Mar. 14, 2024

Related U.S. Application Data

(63) Continuation of application No. PCT/CN2022/094442, filed on May 23, 2022.

(30) Foreign Application Priority Data

May 24, 2021 (CN) .......................... 202110564209.0

(51) Int. Cl.
*F25B 41/35* (2021.01)
*G05B 15/02* (2006.01)

(52) U.S. Cl.
CPC .............. *F25B 41/35* (2021.01); *G05B 15/02* (2013.01); *F25B 2600/2513* (2013.01)

(58) Field of Classification Search
None
See application file for complete search history.

(56) References Cited

U.S. PATENT DOCUMENTS 5,316,263 A 5/1994 Mino
6,586,898 B2 * 7/2003 King ......................... H02P 8/40
318/400.34

(Continued)

FOREIGN PATENT DOCUMENTS

CN 1465984 A 1/2004
CN 101884162 A 11/2010

(Continued)

OTHER PUBLICATIONS

International Search Report from PCT/CN2022/094442 dated Jul. 28, 2022.

(Continued)

*Primary Examiner* — Ariel Mercado-Vargas
(74) *Attorney, Agent, or Firm* — Calfee, Halter & Griswold LLP

(57) ABSTRACT

The present disclosure relates to the technical field of automobiles, and discloses a control method, a control apparatus, and an electronic expansion valve. The control method includes: collecting first jumping signals in real time and recording a first time of collecting each first jumping signal; collecting second jumping signals in real time and recording a second time of collecting each second jumping signal; calculating a difference value between the second time and a corresponding first time; if the difference value is a positive value, increasing or decreasing a counted number by a set value, and accordingly, if the difference value is a negative value, decreasing or increasing the counted number by the set value; and within a set period of time, when the counted number is not increased or decreased, determining that a stepper motor is blocked.

12 Claims, 8 Drawing Sheets

(56) References Cited

U.S. PATENT DOCUMENTS

| | | | | |
|---|---|---|---|---|
| 7,705,555 B2 * | 4/2010 | Pinewski | ............... | H02P 8/36 |
| | | | | 318/434 |
| 8,701,703 B2 * | 4/2014 | Scott | ............... | F16K 31/046 |
| | | | | 137/487 |
| 9,013,133 B2 * | 4/2015 | Russ | ............... | H02P 8/22 |
| | | | | 318/431 |
| 10,612,826 B2 * | 4/2020 | Hern | ............... | F25B 49/02 |
| 11,101,754 B2 * | 8/2021 | Saw | ............... | H02P 8/12 |
| 2015/0362236 A1 * | 12/2015 | Jiang | ............... | F25B 49/02 |
| | | | | 137/12 |
| 2017/0373623 A1 * | 12/2017 | Braat | ............... | H02P 8/38 |
| 2018/0241330 A1 * | 8/2018 | Byers | ............... | H02P 23/0077 |
| 2019/0109551 A1 * | 4/2019 | Saw | ............... | H02P 8/12 |
| 2019/0178404 A1 | 6/2019 | Zhang et al. | | |

FOREIGN PATENT DOCUMENTS

| | | | |
|---|---|---|---|
| CN | 103221726 A | 7/2013 | |
| CN | 103701377 A | 4/2014 | |
| CN | 107015280 A | 8/2017 | |
| CN | 206531937 U | 9/2017 | |
| CN | 107763284 A | 3/2018 | |
| CN | 107763285 A | 3/2018 | |
| CN | 108626919 A | 10/2018 | |
| CN | 109555891 A | 4/2019 | |
| CN | 110985257 A | 4/2020 | |
| CN | 107015280 B | 5/2020 | |
| EP | 3142244 A1 | 3/2017 | |
| JP | S59165993 A | 9/1984 | |
| JP | 2001012633 A | 1/2001 | |
| JP | 2012077646 A | 4/2012 | |
| JP | 2012247340 A | 12/2012 | |
| JP | 2015130749 A | 7/2015 | |
| JP | 2017038492 A | 2/2017 | |
| WO | 2018126910 A1 | 7/2018 | |

OTHER PUBLICATIONS

Office action from Chinese Application 202110564209.0 dated May 25, 2023.

Notice of Allowance of JP application No. 2023-550625 dated Nov. 28, 2024.

Extended European Search Report of EP 22810502.9 dated May 19, 2025.

* cited by examiner

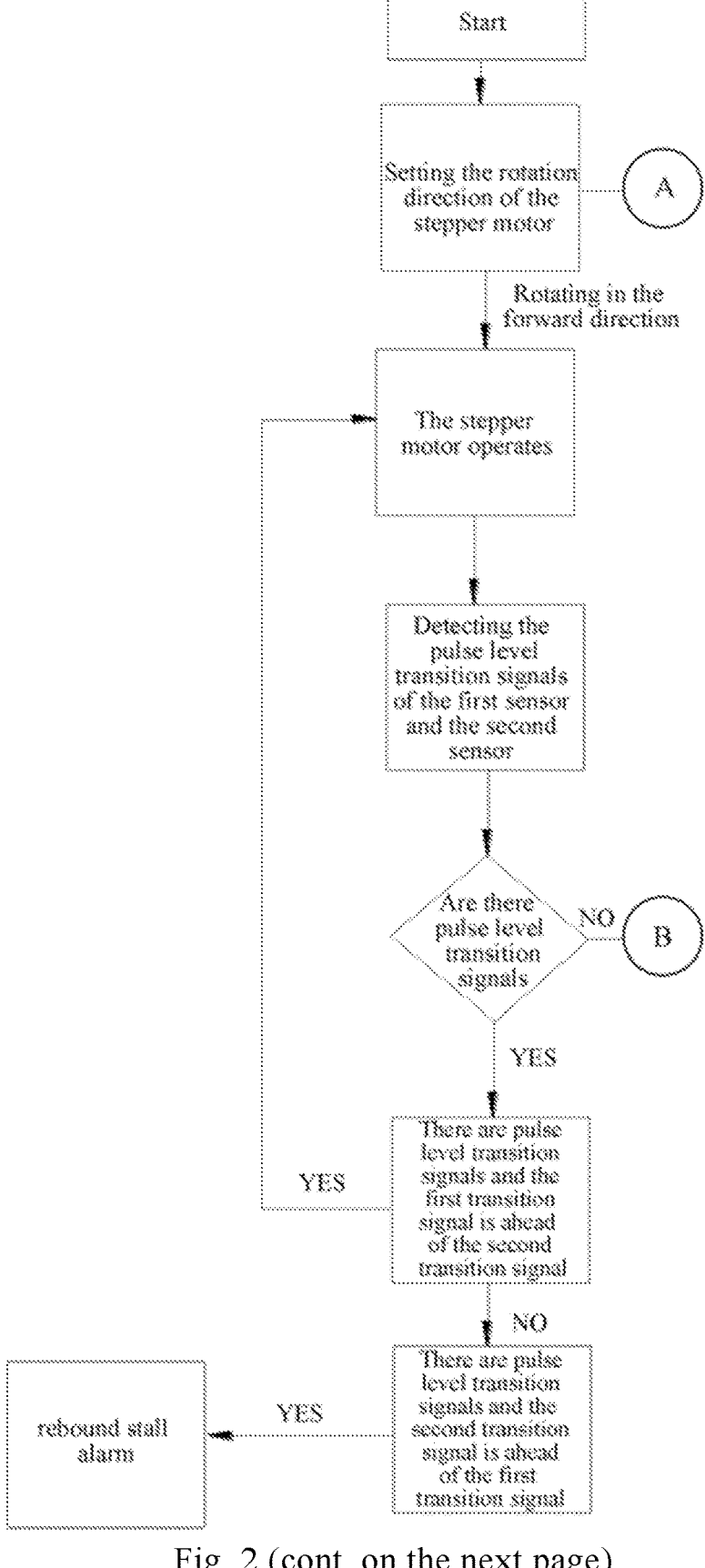
Fig. 2 (cont. on the next page)

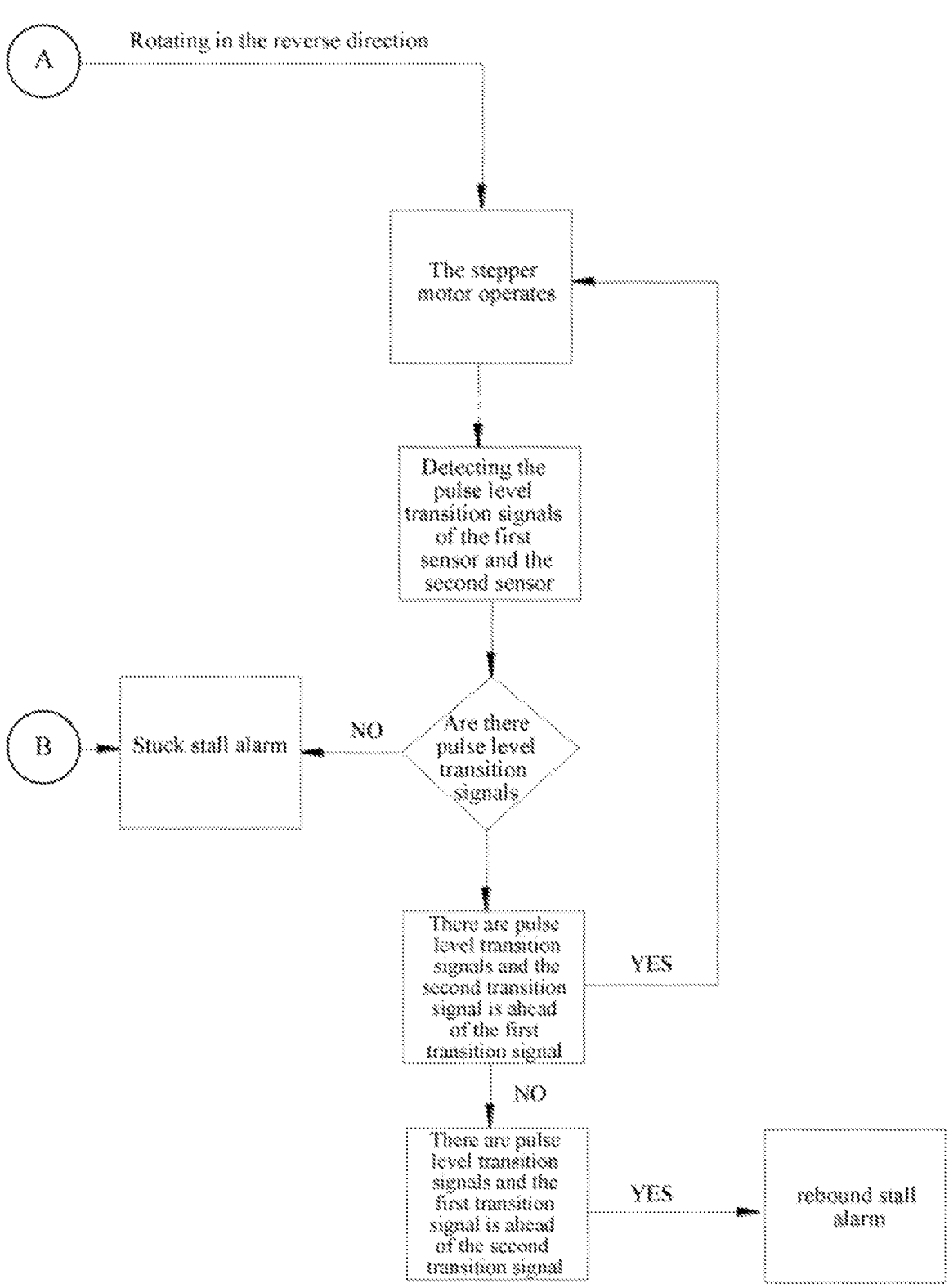
Fig. 2 (cont. from the prior page)

Signal of stall and stuck

Signal of stall and rebound

CONTROL METHOD, CONTROL APPARATUS, AND ELECTRONIC EXPANSION VALVE

CROSS CORRELATION OF RELATED APPLICATION

The present disclosure is a Continuation application of International Application No. PCT/CN2022/094442, filed on May 23, 2022, which claims the priority of the Chinese patent application with the application number 202110564209.0 and the title of "control method, control apparatus, and electronic expansion valve" filed on May 24, 2021, the contents of all of which are incorporated herein by reference in its entirety.

TECHNICAL FIELD

The present disclosure relates to the technical field of automobiles, and specifically to a control method and a control apparatus, including an electronic expansion valve of the control apparatus.

BACKGROUND

In the vehicle system, the electronic expansion valve is used in the refrigeration system to regulate the refrigerant flow. The electronic expansion valve includes a stepper motor, and the stepper motor is controlled by a control device to rotate. When the stepper motor encounters an obstacle during rotation, it may stall.

It should be noted that the information disclosed in the background section is only used to enhance the understanding of the background of the present disclosure, and therefore it may include information that does not constitute prior art known to those skilled in the art.

SUMMARY

According to one aspect of the present disclosure, there is provided a control method, including: acquiring first transition signals in real time and recording a first time point of acquiring each of the first transition signals; acquiring second transition signals in real time and recording a second time point of acquiring each of the second transition signals; calculating a difference between the second time point and a corresponding first time point; if the difference is positive, increasing or decreasing a count value by a set value, and if the difference is negative, decreasing or increasing the count value by the set value; determining that a stepper motor is stalled when the count value does not increase or decrease within a set time period.

In an example embodiment of the present disclosure, determining that the stepper motor is stalled when the count value does not increase or decrease within the set time period includes: determining that the stepper motor has a first stall when the count value does not increase but decreases within the set time period; or determining that the stepper motor has a first stall when the count value does not decrease but increases within the set time period.

In an example embodiment of the present disclosure, determining that the stepper motor is stalled when the count value does not increase or decrease within the set time period includes: determining that the stepper motor has a second stall when the count value remains unchanged within the set time period.

In an example embodiment of the present disclosure, if the difference is positive, the stepper motor is determined to rotate in a forward direction; and if the difference is negative, the stepper motor is determined to rotate in a reverse direction.

According to another aspect of the present disclosure, there is provided a control device, including: a first acquiring component configured to acquire first transition signals in real time and record a first time point of acquiring each of the first transition signals; a second acquiring component configured to acquire second transition signals in real time and record a second time point of acquiring each of the second transition signals; a calculating component configured to calculate a difference between the second time point and a corresponding first time point; a counting component configured to increase or decrease a count value by a set value if the difference is positive, and correspondingly decrease or increase the count value by the set value if the difference is negative; a determining component configured to determine that a stepper motor is stalled when the count value does not increase or decrease within a set time period.

According to yet another aspect of the present disclosure, there is provided a control device, including: a memory storing a computer program; and a processor being coupled to the memory; wherein when the computer program is executed by the processor, the processor is configured for: acquiring first transition signals in real time and recording a first time point of acquiring each of the first transition signals; acquiring second transition signals in real time and recording a second time point of acquiring each of the second transition signals; calculating a difference between the second time point and a corresponding first time point; if the difference is positive, increasing or decreasing a count value by a set value, and if the difference is negative, decreasing or increasing the count value by the set value; determining that a stepper motor is stalled when the count value does not increase or decrease within a set time period.

In an example embodiment of the present disclosure, determining that the stepper motor is stalled when the count value does not increase or decrease within the set time period includes: determining that the stepper motor has a first stall when the count value does not increase but decreases within the set time period; or determining that the stepper motor has a first stall when the count value does not decrease but increases within the set time period.

In an example embodiment of the present disclosure, determining that the stepper motor is stalled when the count value does not increase or decrease within the set time period includes: determining that the stepper motor has a second stall when the count value remains unchanged within the set time period.

According to yet another aspect of the present disclosure, there is provided an electronic expansion valve, including: a stepper motor including a rotor and a stator, where the rotor includes a permanent magnet; a first sensor disposed on the periphery of the permanent magnet, where the first sensor senses a magnetic field change of the rotor and outputs a first transition signal; a second sensor disposed on the periphery of the permanent magnet, wherein the second sensor senses the magnetic field change of the rotor and outputs a second transition signal, and the first sensor and the second sensor are disposed alternately; a control device electrically connected to the first sensor and the second sensor, where the control device is the above mentioned control device.

In an example embodiment of the present disclosure, an angle between the first sensor and the second sensor is α, $$\alpha = m\frac{360°}{2n} + \beta,$$

where m is a positive integer, n is a number of pairs of magnetic poles, and $\beta$ is a positive number less than $$\frac{360°}{2n}.$$

In an example embodiment of the present disclosure, the rotor includes at least one pair of magnetic poles, each pair of magnetic poles includes an N pole and an S pole, and one of the first transition signals is generated when the first sensor senses the magnetic pole of the rotor changes from the N pole to the S pole or from the S pole to the N pole; and one of the second transition signals is generated when the second sensor senses the magnetic pole of the rotor changes from the N pole to the S pole or from the S pole to the N pole.

It should be understood that, the general description above and the detailed description in the following text are only illustrative and explanatory, and cannot limit this disclosure.

BRIEF DESCRIPTION OF THE DRAWINGS

The drawings herein are incorporated into the specification and constitute a part of the specification, showing embodiments consistent with the present disclosure and serving, together with the specification, to explain the principles of the present disclosure. It is apparent that the drawings described below are merely some embodiments of the present disclosure, and those skilled in the art can obtain other drawings based on these drawings without creative labor.

FIG. 2 is a schematic diagram of a control flow of an example embodiment of the control method of the present disclosure.

DESCRIPTION OF THE REFERENCE NUMBERS

Figure 1:
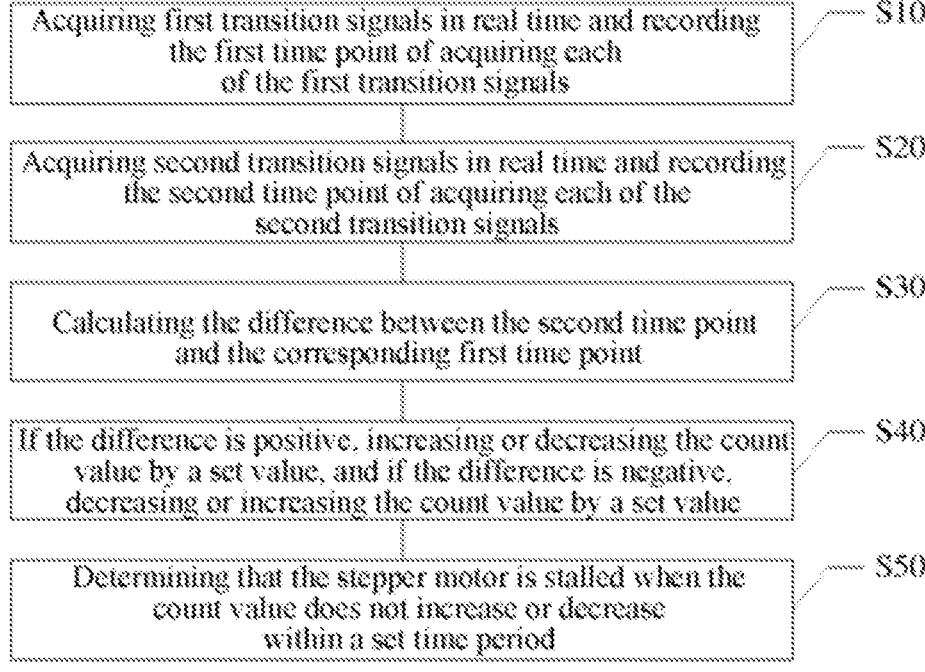
FIG. 1 is a flow diagram of an example embodiment of the control method of the present disclosure.

1. Stepper motor; 11. Rotor; 12. Stator;
2. First sensor; 21. Main body; 22. Connecting part;
3. Second sensor;
4. Circuit board; 41. Connecting hole;
5. Valve needle; 6. Valve seat; 7. Valve body; 8. Valve port components; 9. Screw rod; 10. Nut components; 11. Elastic element;
121. First acquiring component; 122. Second acquiring component; 123. Calculating component; 124. Counting component; 125. Determining component.

DETAILED DESCRIPTION

Example embodiments will now be described more fully with reference to the accompanying drawings. However, example embodiments can be implemented in various forms and should not be construed as limited to the embodiments set forth herein. Rather, these embodiments are provided so that this disclosure will be thorough and complete, and will fully convey the concept of example embodiments to those skilled in the art. The same reference numbers represent the same or similar structures throughout the figures, and thus detailed descriptions thereof will be omitted. In addition, the figures are schematic illustrations of the present disclosure only and are not necessarily drawn to scale.

Although relative terms such as "up" and "down" are used to describe the relative relationship of one component of an icon with respect to another component in the specification, these terms are used in this specification for convenience only, such as in accordance with the direction of the examples described in the figures. It is understood that if the icon device is flipped upside down, the component described as "up" will become the component described as "down". When a structure is "on top" of another structure, it may refer to the fact that one structure is formed integrally on top of another structure, or it may refer to the fact that one structure is "directly" disposed on top of another structure, or it may refer to the fact that one structure is "indirectly" disposed on top of another structure through other structure.

The terms "one", "a", "the", "said", and "at least one" are used to indicate the existence of one or more elements/components/etc.; the terms "including" and "having" are used to indicate an open-ended inclusion and refer to the existence of additional elements/components/etc. in addition to the listed elements/components/etc.; the terms "first", "second", and "third" are used only as markers and do not limit the number of their objects.

Due to the open-loop control for the electronic expansion valve, it is impossible to accurately know the current state and position of the valve body in the case of valve stall and out-of-step. Especially during the reset process, due to the fully closed state of the valve core, long-term continuous reset of stalling can easily lead to changes in the characteristics of the spring, resulting in long reset time and high noise level. If the valve core is stuck, due to the flexible deformation of the spring, the transformation of the counter electromotive force slows down, and it is difficult for the control device to accurately determine stalling through speed loss.

The embodiments of the present disclosure first provide a control method, as shown in FIG. 1 and FIG. 2. The control method may include the following steps.

Step S10: acquiring first transition signals in real time and recording the first time point of acquiring each of the first transition signals.

Step S20: acquiring second transition signals in real time and recording the second time point of acquiring each of the second transition signals.

Step S30: calculating the difference between the second time point and the corresponding first time point.

Step S40, if the difference is positive, increasing or decreasing the count value by a set value, and if the difference is negative, decreasing or increasing the count value by a set value.

Step S50: determining that the stepper motor is stalled when the count value does not increase or decrease within a set time period.

According to the control method and control device of the present disclosure, when the difference between the second time point and the corresponding first time point is positive, it indicates that the first time point of acquiring the first transition signal is less than the second time point of acquiring the second transition signal, and the first transition signal is ahead of the second transition signal. On the contrary, when the difference between the second time point and the corresponding first time point is negative, it indicates that the first time point of acquiring the first transition signal is greater than the second time point of acquiring the second transition signal, and the second transition signal is ahead of the first transition signal. If the difference is positive, the count value is increased by the set value; and if the difference is negative, the count value is decreased by the set value. Within the set time period, and when the count value is not increased or decreased, it is determined that the stepper motor 1 is stalled. When the stepper motor 1 is operating normally, the first transition signal will always be ahead of the second transition signal, or the second transition signal will always be ahead of the first transition signal, so that the count value will always increase or decrease. When the stepper motor 1 is stalled, it will not receive the first transition signal and the second transition signal, so that the count value will remain unchanged within the set time period. When the stepper motor 1 is stalled and rebounds, initially, the first transition signal is ahead of the second transition signal, and then due to the rebound, the second transition signal is ahead of the first transition signal, causing the previously increasing count value to decrease; the original second transition signal is ahead of the first transition signal, and due to the rebound, the first transition signal is ahead of the second transition signal, causing the previously decreasing count value to increase. The control method and control device of the present disclosure make it more accurate, efficient, and convenient to determine the operating state of the stepper motor 1.

The control method and control device are applied to an electronic expansion valve. To more clearly explain the control method and control device, the following description is made for the electronic expansion valve.

Figure 8:
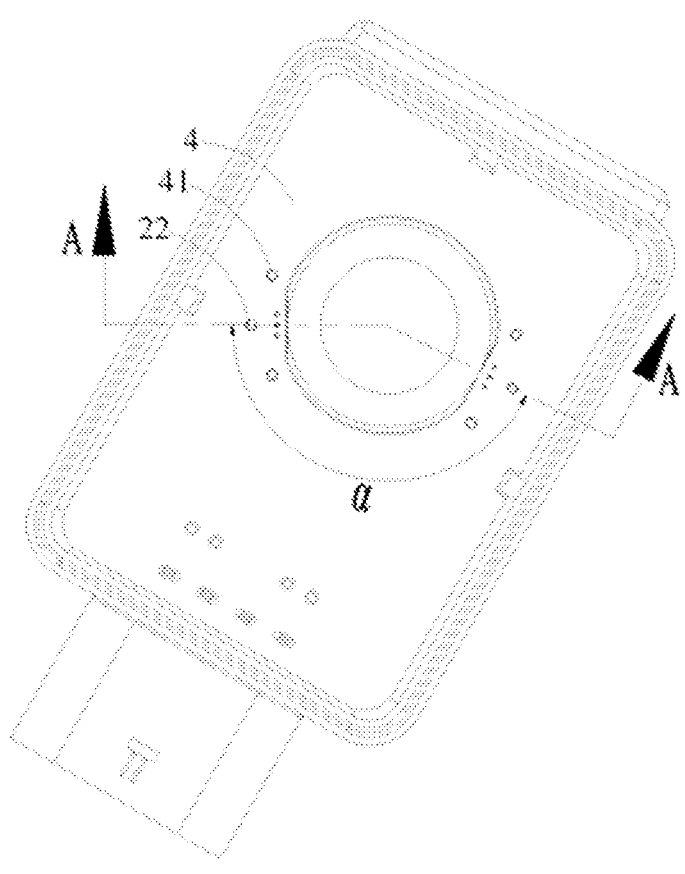
FIG. 8 is a structural schematic diagram of an exemplary embodiment of an electronic expansion valve of the present disclosure.
Figures 9, 10:
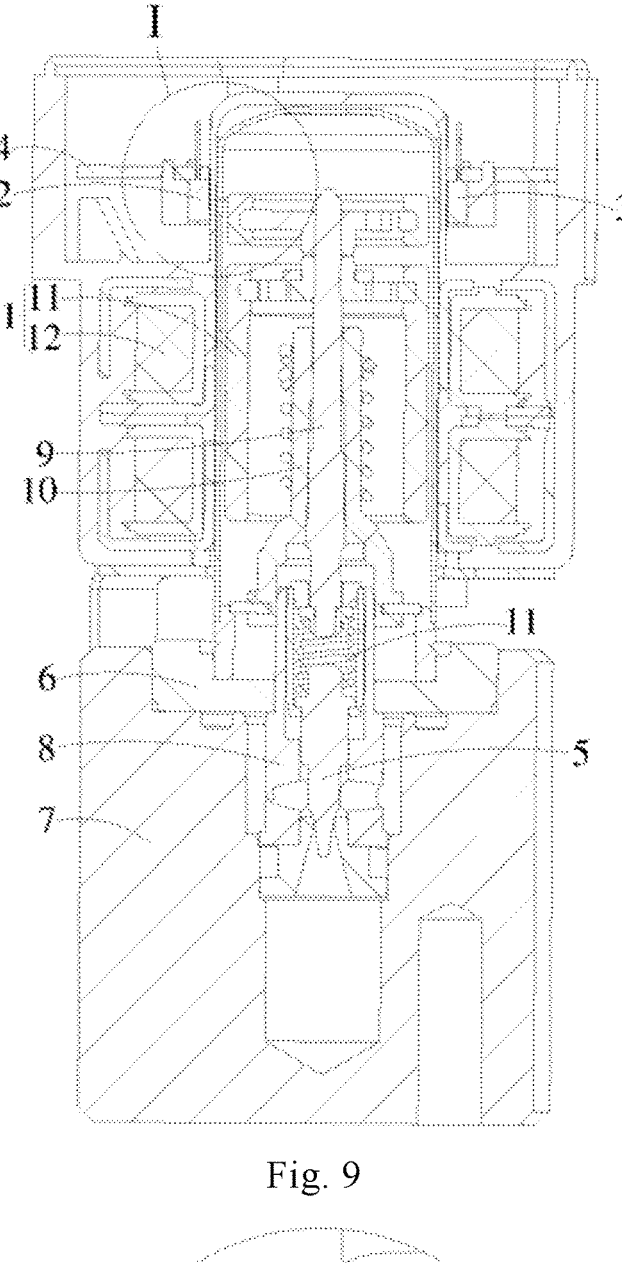
FIG. 9 is a schematic cross-sectional view taken along the line A-A in FIG. 8.
FIG. 10 is a partial enlarged schematic diagram of the part indicated by I in FIG. 9.

In this example embodiment, as shown in FIG. 8, FIG. 9, and FIG. 10, the electronic expansion valve may include a first sensor 2, a second sensor 3, a control device, a stepper motor 1, a valve, and so on. The control device controls the operation of the stepper motor 1, and the stepper motor 1 drives the valve to open and close.

The stepper motor 1 may include a rotor 11 and a stator 12. The rotor 11 may include a permanent magnet, and the permanent magnet may include at least one pair of magnetic poles. The stator 12 may include a coil and a magnetic permeable part. A current that varies in a certain regular pattern flows through the coil, thereby forming an excitation magnetic field at the magnetic permeable part. The magnetic field of the permanent magnet of the rotor 11 interacts with the excitation magnetic field of the magnetic poles of the stator 12, allowing the rotor 11 to rotate around a central axis.

The rotor 11 includes at least one pair of magnetic poles. Each pair of magnetic poles includes an N pole and an S pole, which are spaced apart along the circumferential direction of the rotor 11. In this embodiment, the electronic expansion valve uses a stepper motor 1 with two phases and ten pairs of magnetic poles. The rotor 11 includes ten N poles and ten S poles, that is, the rotor 11 includes twenty magnetic poles and the twenty magnetic poles are arranged along the circumference of the rotor 11.

The first sensor 2 and the second sensor 3 are located on the outer periphery of the rotor 11 and are arranged close to the rotor 11. When the rotor 11 rotates, the N poles and S poles of the rotor 11 alternately pass through the first sensor 2 and the second sensor 3. The first sensor 2 will sense the magnetic field changes of the rotor 11 and generate a periodic first feedback signal. The first feedback signal is square wave and includes a plurality of first transition signals. The second sensor 3 will sense the magnetic field changes of the rotor 11 and generate a periodic second feedback signal. The second feedback signal is square wave and includes a plurality of second transition signals. That is, from the N pole to the S pole or from the S pole to the N pole, the first sensor 2 generates a first transition signal and the second sensor 3 generates a second transition signal. The first transition signal and the second transition signal transitions from low level to high level or from low level to high level. When the stepper motor 1 runs one circle, that is, the rotor 11 rotates one revolution, it will generate 20 first transition signals and 20 second transition signals.

The control device may be a microprocessor, a single-chip microcomputer, or the like, and is used to implement the control method described above.

The steps of the control method will be described in detail hereinafter.

Step S10: acquiring first transition signals in real time and recording a first time point of acquiring each of the first transition signals.

In this example embodiment, the first transition signal is a signal generated by the first sensor 2 sensing a change from the N pole to the S pole or from the S pole to the N pole, resulting in a transition from low level to high level or a transition from low level to high level. The rotor 11 rotating one revolution will generate 20 first transition signals, and the control device acquires 20 first transition signals in real time; and records the first time point of acquiring each of the first transition signals, that is, the control apparatus records 20 first time points, and the 20 first time points correspond one-to-one with the 20 first transition signals.

Step S20: acquiring second transition signals in real time and recording a second time point of acquiring each of the second transition signals.

In this example embodiment, the second transition signal is a signal generated by the second sensor 3 sensing a change from the N pole to the S pole or from the S pole to the N pole, resulting in a transition from low level to high level or a transition from low level to high level. The rotor 11 rotating one revolution will generate 20 second transition signals, and the control device acquires 20 second transition signals in real time; and the control device records a second time point of acquiring each of the second transition signals, that is, the control device records 20 second time points, and the 20 second time points correspond one-to-one with the 20 second transition signals.

It should be noted that the number of the first transition signals and the second transition signals is related to the number of pairs of magnetic poles included in the rotor 11. In other example embodiments of the present disclosure, the number of pairs of magnetic poles changes, and the number of the first transition signals and the second transition signals also changes, but both fall within the scope of protection of the present disclosure.

Step S30: calculating the difference between the second time point and the corresponding first time point.

In this example embodiment, the number of second time points is the same as the number of first time points. The 20 first time points are sorted in order of recording as T101, T102, T103, . . . , T119, T120. The 20 second time points are sorted in order of recording as T201, T202, T203, . . . , T219, T220. The first time points corresponding to the second time points refer to their sequence numbers being consistent. For example, the first time point corresponding to the second time point T101 is T201, the first time point corresponding to the second time point T102 is T202, and so on. Calculate the difference between the second time point and the corresponding first time point, that is, subtract the first time point from the second time point, for example, T201-T101.

Step S40, if the difference is positive, increasing or decreasing the count value by a set value, and if the difference is negative, decreasing or increasing the count value by a set value.

In this example embodiment, the difference between the second time point and the corresponding first time point is positive, indicating that the first time point of acquiring the first transition signal is less than the second time point of acquiring the second transition signal, and the first transition signal is ahead of the second transition signal, that is, the first sensor 2 senses the change from the N pole to the S pole or the operation from the S pole to the N pole first, and it can be determined that the stepper motor 1 rotates in a forward direction. The set value can be 1, that is, if the difference is positive, the count value is increased by 1.

On the contrary, if the difference between the second time point and the corresponding first time point is negative, it indicates that the first time point of acquiring the first transition signal is greater than the second time point of acquiring the second transition signal, and the second transition signal is ahead of the first transition signal, that is, the second sensor 3 senses the change from the N pole to the S pole or the operation from the S pole to the N pole first, and it can be determined that the stepper motor 1 rotates in a reverse direction. The set value can be 1, that is, if the difference is negative, the count value is decreased by 1.

Of course, the above set value is only an example, and the value can be set according to needs. The value of the above set value does not constitute a limitation of the present disclosure.

It should be noted that in other example embodiments of the present disclosure, different counting methods can also be adopted. For example, if the difference value is positive, the count value is decreased by the set value, and if the difference value is negative, the count value is increased by the set value.

Step S50: when the count value does not increase or decrease within the set time period, determining that the stepper motor 1 is stalled.

Figure 3:
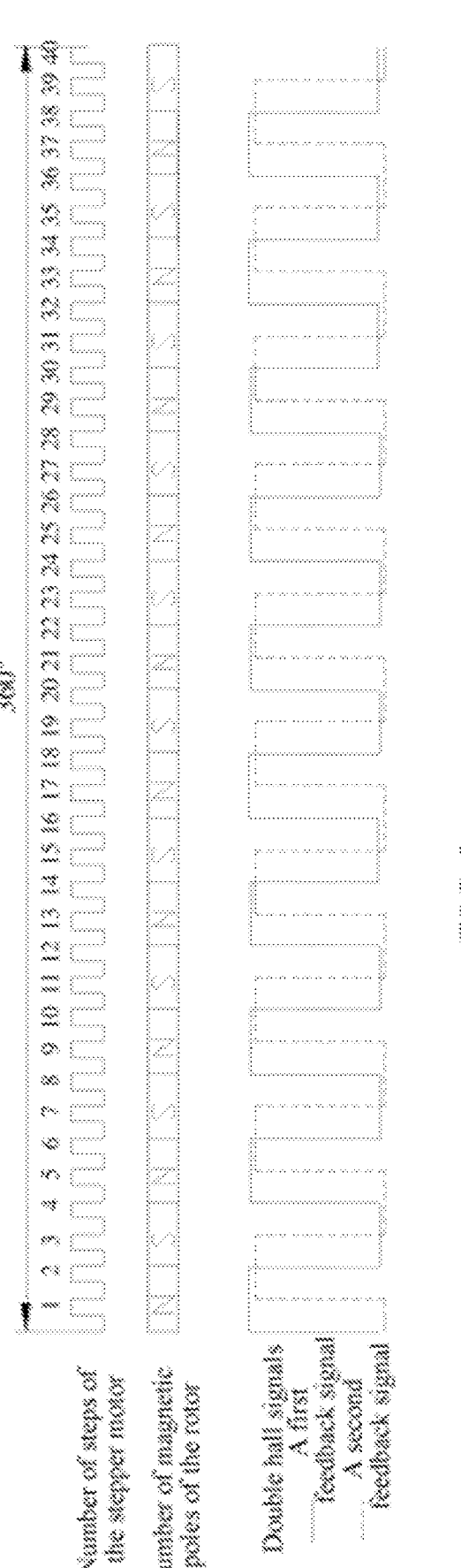
FIG. 3 is a schematic diagram of the corresponding relationship of the number of running steps, the rotor magnetic pole, the first feedback signal and the second feedback signal in time when the stepper motor of the electronic expansion valve rotates in a forward direction.
Figure 4:
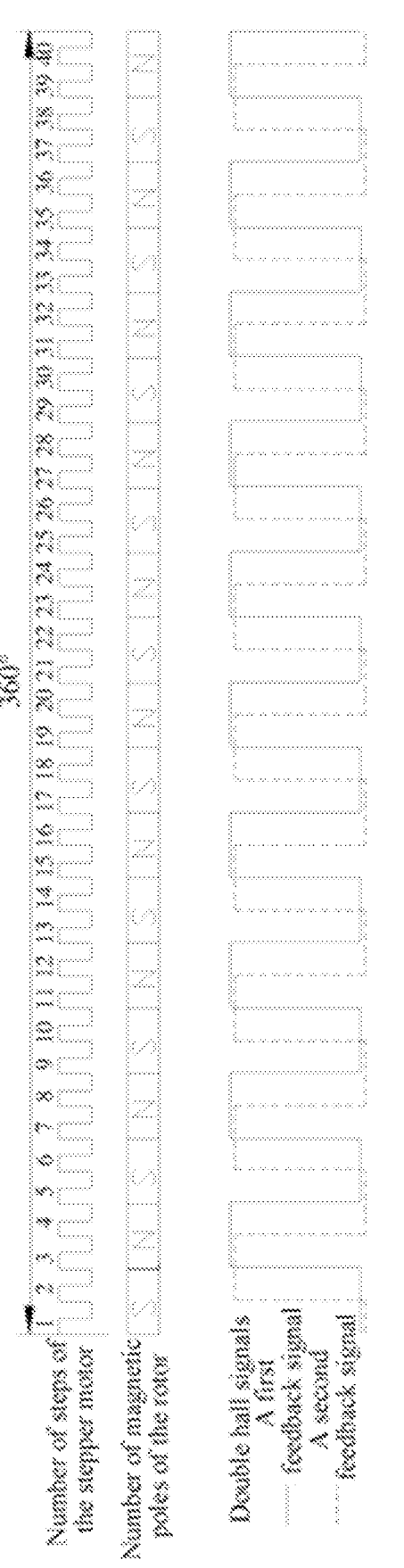
FIG. 4 is a schematic diagram of the corresponding relationship of the number of running steps, the rotor magnetic pole, the first feedback signal and the second feedback signal in time when the stepper motor of the electronic expansion valve rotates in a reverse direction.

In this example embodiment, when the stepper motor 1 is operating normally, for example, when it is rotating in the forward direction, referring to FIG. 3, the first transition signal will always be ahead of the second transition signal, causing the count value to always gradually increase; for example, when it is rotating in the reverse direction, referring to FIG. 4, the second transition signal will always be ahead of the first transition signal, causing the count value to always gradually decrease.

Stall can include a first stall and a second stall. The first stall can be a stall rebound, which typically occurs near the top dead center and bottom dead center. The second stall can be a stall stuck, which typically occurs between the top dead center and bottom dead center.

Figure 5:
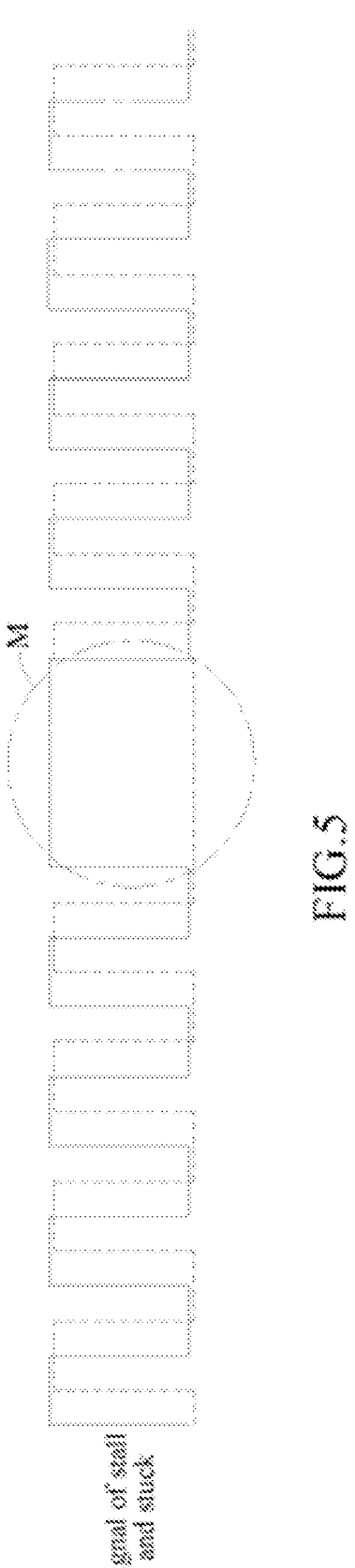
FIG. 5 is a schematic diagram of the principle when the electronic expansion valve is stalled and stuck.

Referring to FIG. 5, as indicated by M, when the stepper motor 1 is stalled and stuck (i.e., the second stall), the rotor 11 does not rotate, and therefore the rotor 11 does not receive the first transition signals and the second transition signals, resulting in the count value remaining unchanged for the set time period.

Figure 6:
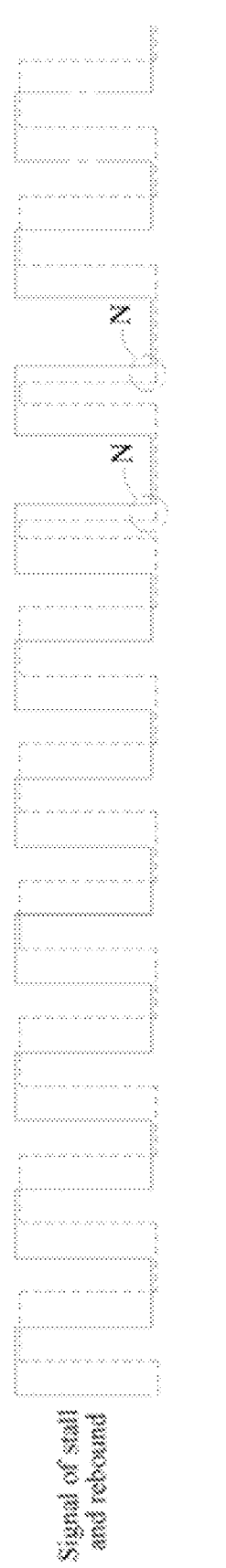
FIG. 6 is a schematic diagram of the principle when the electronic expansion valve is stalled and rebounds.

Referring to FIG. 6, as indicated by N, when the stepper motor 1 is stalled and rebounds (i.e., the first stall), initially, the first transition signals are ahead of the second transition signals, and then due to the rebound, the second transition signals are ahead of the first transition signal, causing the previously increasing count value to decrease. Therefore, when the count value does not increase but decreases within the set time period, it is determined that the stepper motor 1 has a first stall. Similarly, initially, the second transition signals are ahead of the first transition signals, and then due to the rebound, the first transition signals are ahead of the second transition signals, causing the previously decreasing count value to increase. Therefore, when the count value does not decrease but increases within the set time period, it is determined that the stepper motor 1 has a first stall.

In this example embodiment, the stepper motor 1 of the electronic expansion valve uses a thirty-two micro-step control scheme. One full step includes thirty-two micro-steps. The stepper motor 1 runs two full steps, corresponding to a change in the magnetic pole of the rotor 11. That is, the running duration after a transition signal transitions includes time corresponding to two full steps, which is time of theoretically sixty-four micro-steps.

Specifically, referring to FIG. 3, when the electronic expansion valve is operating normally, the stepper motor 1 runs for corresponding time of two full steps. The first sensor 2 corresponds to the magnetic pole of the rotor 11 rotating from one end of the N pole to the junction of the N and S poles, and the corresponding first transition signal is at high level. As the stepper motor 1 runs, the first sensor 2 corresponds to the magnetic pole of the rotor 11 changing from the N pole to the S pole, and the first transition signal transitions to low level. The stepper motor 1 runs for two full steps, the first sensor 2 corresponds to the magnetic pole of the rotor 11 rotating from the S pole to the junction of the N and S poles, and the first transition signal remains at low level. As the stepper motor 1 runs, the first sensor 2 corresponds to the magnetic pole of the rotor 11 changing from the S pole to the N pole, and the first transition signal transitions to high level. Repeatedly running in this way, the rotor 11 rotates one revolution, the stepper motor 1 runs for 40 full steps, and produces 20 first transition signals. The running duration of the high and low levels of the first transition signals is equal to the corresponding time of two full steps.

In this example embodiment, a set time period is defined as the time corresponding to at least two full steps of the stepper motor 1. The set time period T is related to the motor speed n, the number of pairs p of magnetic poles of the rotor

11, and the number of motor phases m, with the specific relationship being as follows: T=60/(n*m*P), where n is in revolutions per minute, m=2, and p=10.

It should be noted that although the steps of the control method in this disclosure are described in a specific order in the drawings, this does not require or imply that the steps must be performed in that specific order, or that all of the steps shown must be performed to achieve the desired result. Additional or alternative steps may be omitted, a plurality of steps may be combined into one step, and/or one step may be decomposed into a plurality of steps. For example, steps S10 and S20 may be interchanged, and steps S30 and S40 may be combined into one step.

Figure 7:
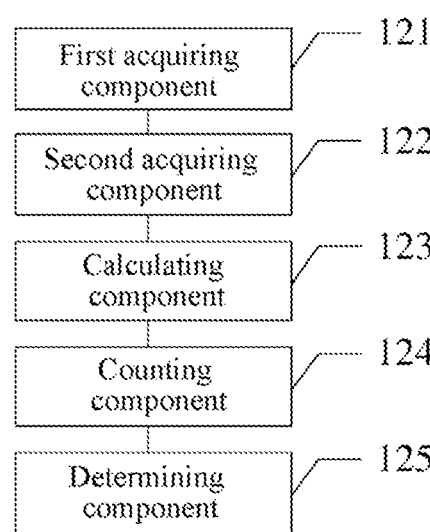
FIG. 7 is a schematic block diagram of an example embodiment of the control device of the present disclosure.

Furthermore, the embodiments of the present disclosure also provide a control device. Referring to FIG. 7, the control device may include a first acquiring component 121, a second acquiring component 122, a calculating component 123, a counting component 124, and a judging component 125. The first acquiring component 121 may be configured to acquire first transition signals in real time and record a first time point of acquiring each of the first transition signals. The second acquiring component 122 may be configured to acquire second transition signals in real time and record a second time point of acquiring each of the second transition signals. The calculating component 123 may be configured to calculate the difference between the second time point and the corresponding first time point. The counting component 124 may be configured to increase or decrease a set value if the difference is positive, and correspondingly decrease or increase the set value if the difference is negative. The determining component 125 may be configured to determine that the stepper motor 1 is stalled if the count value does not increase or decrease within the set time period.

In this example embodiment, determining that the stepper motor 1 is stalled when the count value does not increase or decrease within a set time period includes: determining that the stepper motor 1 has a first stall when the count value does not increase but decreases within the set time period; or determining that the stepper motor 1 has a first stall when the count value does not decrease but increases.

In this example embodiment, determining that the stepper motor 1 is stalled when the count value does not increase or decrease within a set time period includes determining that the stepper motor 1 has a second stall when the count value remains unchanged within a set time period.

In this example embodiment, if the difference is positive, it is determined that the stepper motor 1 rotates in the forward direction; if the difference is negative, it is determined that the stepper motor 1 rotates in the reverse direction.

The specific details of each component in the above control device have been described in detail in the corresponding control method, so they are not repeated here.

Furthermore, the embodiments of the present disclosure also provide an electronic expansion valve, referring to the structural schematic diagram of the electronic expansion valve shown in FIG. 8, FIG. 9 and FIG. 10. The electronic expansion valve may include a stepper motor 1, a first sensor 2, a second sensor 3, and a control device. The stepper motor 1 may include a rotor 11 and a stator 12, and the rotor 11 includes a permanent magnet. The first sensor 2 is disposed on the periphery of the permanent magnet, and the first sensor 2 senses the magnetic field change of the rotor 11 and outputs first transition signals. The second sensor 3 is disposed on the periphery of the permanent magnet, and the second sensor 3 senses the magnetic field change of the rotor

11 and outputs second transition signals. The first sensor 2 and the second sensor 3 are arranged alternately. The control device is electrically connected to the first sensor 2 and the second sensor 3, and the control device is the control device described in any of the above items.

The specific structure of the control device and control method have been described in detail above, so they will not be repeated here.

The specific structure of the stepper motor 1 has also been described in detail above, so it will not be repeated here.

The first sensor 2 can be a Hall sensor or a position sensor, and the first transition signal is a Hall signal. The second sensor 3 can also be a Hall sensor or a position sensor, and the second transition signal is also a Hall signal. The first sensor 2 and the second sensor 3 are arranged alternately, so that the first sensor 2 and the second sensor 3 cannot simultaneously sense the magnetic field change of the rotor 11. Specifically, the angle between the first sensor 2 and the second sensor 3 is a, that is, the angle between the center line of the first sensor 2 and the center line of the second sensor 3 is $\alpha$, $$\alpha = m\frac{360°}{2n} + \beta,$$

In the formula, m is a positive integer, m is less than or equal to 2n; n is the number of pairs of the magnetic poles, and $\beta$ is a positive number less than $$\frac{360°}{2n}.$$

In the present exemplary embodiment, the angle between the center line of the first sensor 2 and the center line of the second sensor 3 is $\alpha$, which is approximately 154 degrees.

The first sensor 2 may include a main body 21 and a connecting portion 22. The connecting portion 22 is electrically connected to the circuit board 4 and is welded and fixed to the circuit board 4. Specifically, a communication hole 41 is formed on the circuit board 4, and the connecting portion 22 is disposed through the communication hole 41 and is welded and fixed to the circuit board 4.

The electronic expansion valve may also include a valve, and the valve may include a valve needle 5, a valve seat 6, a valve body 7, and a valve port component 8. The valve needle 5 is driven by a rotor 11 to move between a top dead center and a bottom dead center. When the valve needle 5 is located at the bottom dead center, the flow channels on both sides of the valve port are blocked and the valve port is closed. As the valve needle 5 moves from the bottom dead center to the top dead center, the valve port is gradually opened, and the flow channels on both sides are connected through the gap between the valve port and the valve needle 5. When the valve needle 5 reaches the top dead center, the opening of the valve port reaches its maximum. In this embodiment, the flow channels on both sides of the valve port are formed on the valve body 7. The valve port is located between the flow channels of two sides. The valve port component 8 is formed with a valve port. The valve port component 8 is fixedly connected to the valve body 7. The valve seat 6 is fixedly connected to the valve body 7. The valve needle 5 and the rotor 11 are connected and arranged.

The electronic expansion valve may also include a screw rod 9, a nut component 10, and a stop rod. The nut component 10 is sleeved on the periphery of the screw rod, and the nut component 10 and the screw rod are threaded engaged. The nut component 10 is fixedly disposed relative to the valve seat 6, and the nut component 10 is fixedly disposed within the inner ring of the rotor 11. The rotor 11 can drive the nut component 10 to rotate, allowing the screw rod to move upward or downward relative to the nut component 10. The stop rod is fixedly connected to the screw rod through a connecting plate, and the stop rod moves upward or downward relative to the nut component 10. The stop rod and the nut component 10 cooperate to limit the motion of the screw rod between the top dead center and the bottom dead center. Since the valve needle 5 is fixedly connected to the screw rod, the motion of the valve needle 5 is limited to the distance between the top dead center and the bottom dead center. An elastic element 11 is disposed between the valve needle 5 and the screw rod 9, and the elastic element 11 may be a spring. When the valve needle 5 moves to the bottom dead center, the valve needle 5 and the valve port component 8 come into elastic contact, buffering the valve needle 5 and the valve port component 8, which is beneficial to improving the life of the two components. However, when a stall occurs near the top dead center and the bottom dead center, due to the flexible deformation of the elastic element 11, a rebound may occur, resulting in a periodic oscillatory waveform of the pulses fed back by the first sensor and the second sensor, making it impossible to determine whether a stall has occurred or making it possible to misjudge a stall.

Those skilled in the art will easily conceive of other embodiments of the present disclosure after considering the specification and practicing the disclosure herein. The present application aims to cover any variations, uses, or adaptations of the present disclosure, which comply with the general principles of the present disclosure and include common knowledge or conventional technical means in the technical field which is not disclosed in the present disclosure. The specification and embodiments are only regarded as exemplary, and the true scope and spirit of the present disclosure are indicated by the appended claims.

What is claimed is:

1. A control method, comprising:
   acquiring first transition signals in real time and recording a first time point of acquiring each of the first transition signals, wherein the first transition signals are output by a first sensor which senses a magnetic field change of a rotor;
   acquiring second transition signals in real time and recording a second time point of acquiring each of the second transition signals, wherein the second transition signals are output by a second sensor which senses the magnetic field change of the rotor;
   calculating a difference between the second time point and a corresponding first time point;
   in response to the difference being positive, increasing a count value by a set value, and in response to the difference being negative, decreasing the count value by the set value; or
   in response to the difference being positive, decreasing a count value by a set value, and in response to the difference being negative, increasing the count value by the set value; and
   determining that a stepper motor is stalled in response to that the count value which has been gradually increasing does not increase or the count value which has been gradually decreasing does not decrease within a set time period.

2. The control method according to claim 1, wherein determining that the stepper motor is stalled in response to that the count value which has been gradually increasing does not increase or the count value which has been gradually decreasing does not decrease within the set time period comprises:
   determining that the stepper motor has a first stall in response to that the count value which has been gradually increasing decreases within the set time period; or
   determining that the stepper motor has a first stall in response to that the count value which has been gradually decreasing increases within the set time period.

3. The control method according to claim 1, wherein determining that the stepper motor is stalled in response to that the count value which has been gradually increasing does not increase or the count value which has been gradually decreasing does not decrease within the set time period comprises:
   determining that the stepper motor has a second stall in response to that the count value remains unchanged within the set time period.

4. The control method according to claim 1, wherein the stepper motor is determined to rotate in a forward direction in response to the difference being positive; and the stepper motor is determined to rotate in a reverse direction in response to the difference being negative.

5. A control device, comprising:
   a memory storing a computer program; and
   a processor being coupled to the memory;
   wherein when the computer program is executed by the processor, the processor is configured for:
   acquiring first transition signals in real time and recording a first time point of acquiring each of the first transition signals, wherein the first transition signals are output by a first sensor which senses a magnetic field change of a rotor;
   acquiring second transition signals in real time and recording a second time point of acquiring each of the second transition signals, wherein the second transition signals are output by a second sensor which senses the magnetic field change of the rotor;
   calculating a difference between the second time point and a corresponding first time point;
   in response to the difference being positive, increasing a count value by a set value, and in response to the difference being negative, decreasing the count value by the set value; or
   in response to the difference being positive, decreasing a count value by a set value, and in response to the difference being negative, increasing the count value by the set value; and
   determining that a stepper motor is stalled in response to that the count value which has been gradually increasing does not increase or the count value which has been gradually decreasing does not decrease within a set time period.

6. The control device according to claim 5, wherein determining that the stepper motor is stalled in response to that the count value which has been gradually increasing does not increase or the count value which has been gradually decreasing does not decrease within the set time period comprises:
   determining that the stepper motor has a first stall in response to that the count value which has been gradually increasing decreases within the set time period; or determining that the stepper motor has a first stall in response to that the count value which has been gradually decreasing increases within the set time period.

7. The control device according to claim 5, wherein determining that the stepper motor is stalled in response to that the count value which has been gradually increasing does not increase or the count value which has been gradually decreasing does not decrease within the set time period comprises:

determining that the stepper motor has a second stall in response to that the count value remains unchanged within the set time period.

8. An electronic expansion valve, comprising:

a stepper motor comprising a rotor and a stator, wherein the rotor comprises a permanent magnet;

a first sensor disposed on the periphery of the permanent magnet, wherein the first sensor senses a magnetic field change of the rotor and outputs a first transition signal;

a second sensor disposed on the periphery of the permanent magnet, wherein the second sensor senses the magnetic field change of the rotor and outputs a second transition signal, and the first sensor and the second sensor are disposed alternately;

a control device electrically connected to the first sensor and the second sensor, wherein the control device comprises:

a memory storing a computer program; and a processor being coupled to the memory;

wherein when the computer program is executed by the processor, the processor is configured for:

acquiring the first transition signals in real time and recording a first time point of acquiring each of the first transition signals;

acquiring the second transition signals in real time and recording a second time point of acquiring each of the second transition signals;

calculating a difference between the second time point and a corresponding first time point;

in response to the difference being positive, increasing a count value by a set value, and in response to the difference being negative, decreasing the count value by the set value; or in response to the difference being positive, decreasing a count value by a set value, and in response to the difference being negative, increasing the count value by the set value; and determining that a stepper motor is stalled in response to that the count value which has been gradually increasing does not increase or the count value which has been gradually decreasing does not decrease within a set time period.

9. The electronic expansion valve according to claim 8, wherein an angle between the first sensor and the second sensor is $\alpha$, $$\alpha = m\frac{360°}{2n} + \beta,$$

wherein m is a positive integer, n is a number of pairs of magnetic poles, and $\beta$ is a positive number less than $$\frac{360°}{2n}.$$

10. The electronic expansion valve according to claim 8, wherein the rotor comprises at least one pair of magnetic poles, each pair of magnetic poles comprises an N pole and an S pole, and one of the first transition signals is generated in response to that the first sensor senses the magnetic pole of the rotor changes from the N pole to the S pole or from the S pole to the N pole; and one of the second transition signals is generated in response to that the second sensor senses the magnetic pole of the rotor changes from the N pole to the S pole or from the S pole to the N pole.

11. The electronic expansion valve according to claim 8, wherein determining that the stepper motor is stalled in response to that the count value which has been gradually increasing does not increase or the count value which has been gradually decreasing does not decrease within the set time period comprises:

determining that the stepper motor has a first stall in response to that the count value which has been gradually increasing decreases within the set time period; or determining that the stepper motor has a first stall in response to that the count value which has been gradually decreasing increases within the set time period.

12. The electronic expansion valve according to claim 8, wherein determining that the stepper motor is stalled in response to that the count value which has been gradually increasing does not increase or the count value which has been gradually decreasing does not decrease within the set time period comprises:

determining that the stepper motor has a second stall in response to that the count value remains unchanged within the set time period.

* * * * *